United States Patent
Fichtel et al.

(10) Patent No.: US 9,597,654 B2
(45) Date of Patent: Mar. 21, 2017

(54) MODIFIED TRASS AND PROCESS FOR ITS PREPARATION

(71) Applicant: FTU GmbH Forschung und Technische Entwicklung im Umweltschutz, Starnberg (DE)

(72) Inventors: Konrad Fichtel, Starnberg (DE); Michael Fichtel, Starnberg (DE); Roland Fichtel, Unterbrunn (DE)

(73) Assignee: FTU GmbH Forschung und Technische Entwicklung im Umweitschutz, Starnberg (DE)

( * ) Notice: Subject to any disclaimer, the term of this patent is extended or adjusted under 35 U.S.C. 154(b) by 0 days.

(21) Appl. No.: 14/409,376

(22) PCT Filed: Jun. 21, 2013

(86) PCT No.: PCT/EP2013/063079
§ 371 (c)(1),
(2) Date: Dec. 18, 2014

(87) PCT Pub. No.: WO2013/190135
PCT Pub. Date: Dec. 27, 2013

(65) Prior Publication Data
US 2015/0238928 A1    Aug. 27, 2015

(30) Foreign Application Priority Data
Jun. 21, 2012    (DE) .................. 10 2012 012 367

(51) Int. Cl.
| | |
|---|---|
| *B01J 20/16* | (2006.01) |
| *B01J 20/28* | (2006.01) |
| *B01D 53/02* | (2006.01) |
| *B01J 20/32* | (2006.01) |
| *B01J 20/30* | (2006.01) |
| *B01J 20/20* | (2006.01) |

(52) U.S. Cl.
CPC .............. *B01J 20/16* (2013.01); *B01D 53/02* (2013.01); *B01J 20/165* (2013.01); *B01J 20/20* (2013.01); *B01J 20/28059* (2013.01); *B01J 20/28061* (2013.01); *B01J 20/3071* (2013.01); *B01J 20/3204* (2013.01); *B01J 20/3236* (2013.01); *B01D 2253/106* (2013.01); *B01D 2253/11* (2013.01); *B01D 2253/25* (2013.01); *B01D 2253/306* (2013.01); *B01D 2257/2064* (2013.01); *B01D 2257/602* (2013.01)

(58) Field of Classification Search
None
See application file for complete search history.

(56) References Cited

U.S. PATENT DOCUMENTS 7,981,375 B2 *   7/2011   Ramberg ............... B01D 53/02
                                              264/628

FOREIGN PATENT DOCUMENTS

| BE | 784474 | * | 10/1972 |
|---|---|---|---|
| CN | 102976434 | * | 12/2012 |
| DE | 19745191 | * | 10/1997 |
| JP | 2006/282410 A | | 10/2006 |
| WO | WO 2010/128534 A1 | | 11/2010 |
| WO | WO 2012/071206 A1 | | 5/2012 |

OTHER PUBLICATIONS

Liebig, E. et al. "Pozzolanic Activity of Volcanic Tuff and Suevite: Effects of Calcination". Cement and Concrete Research. 567-575 (1998).*

* cited by examiner

*Primary Examiner* — Melvin C Mayes
*Assistant Examiner* — Sheng H Davis
(74) *Attorney, Agent, or Firm* — Knobbe, Martens, Olson & Bear, LLP

(57) ABSTRACT

Modified Trass material has an enlarged active surface compared to native Trass. A method of preparation of the Modified Trass includes contacting Trass with an agent capable to dissolve away components in the Trass, and removing the dissolved components from the Trass. The modified Tass can be used for removing substances from fluids, in particular from exhaust gases of combustion plants.

15 Claims, No Drawings

MODIFIED TRASS AND PROCESS FOR ITS PREPARATION

FIELD OF THE INVENTION

The present invention relates to a modified Trass mineral, having an enlarged active surface as compared to native Trass. The invention further pertains to the use of the modified Trass for removing substances from fluids, in particular from exhaust gases of combustion plants. Also embraced by the present invention is the use of the modified Trass as a carrier of catalytic agents and/or materials that bind contaminants.

BACKGROUND OF THE INVENTION

Nowadays fossil fuels, such as gas, oil and coal are largely used for producing electrical or heat energy, for burning away waste or for converting or purifying substances, in particular ore. Due to an increasing demand of electrical energy and the concurrent pullout from running nuclear power plants in countries such as Germany and Japan, coal has gained an increased attraction, since it is also present in industrial countries themselves.

In China each year coal fired power stations with a forecast capacity of about 70 GW are constructed. In Germany about half of the electrical energy is produced by burning coal, with its share in the electrical energy production increasing due to the planned exit from using nuclear energy.

DETAILED DESCRIPTION OF THE PREFERRED EMBODIMENT

A well know disadvantage of burning coal as compared to e.g. burning gas or even oil resides in a relative high emission of contaminants contained therein, comprising apart from carbon dioxide also sulfur dioxide, nitrogen oxide, carbohydrates, hydrochloric acid, dioxines, furanes, flue dust and carbon black. This applies in particular for garbage incineration plants, where an inhomogeneous mixture of a variety of different articles are burned away.

Another problem in operating combustion plants resides in that highly toxic heavy metals, such as mercury, which are contained in the materials to be burnt away, are emitted into the environment.

Among others for the above reasons combustion plants may be operated only when provided with a complex emission control, which ensure an essentially complete removal of noxious substances from the exhaust gases. However, even though much effort has been put into such control measures the mercury output worldwide has been found to increase. This increase is mainly attributed to an augmented burn of coal in combustion plants. According to information provided by the environmental program of the United Nations (UNEP) 498 tons mercury (HG) had been emitted into the environment in 2005, with Germany contributing to the amount by about 6 tons, the US by about 50 tons and China with more than 100 tons.

Exhaust gases emitted from combustion plants, like coal fired power stations, waste incineration plants, or ore roasting plants comprise gaseous constituents, but also liquid, fluid and solid components. For removing solid components from exhaust gases generally dedusting procedures are put to use, such as by using surface filtering means, electrical precipitators, gas washers and centrifugal separators. Gaseous and liquid or fluid materials are essentially removed from exhaust gases by means of thermal post-combustion, catalytic conversion, absorption and/or adsorption. Due to economic constraints the methods of absorption and adsorption have received much attention, since exhaust gases may be purified from noxious substances in an cost-effective manner.

An easy approach for absorbing contaminants is conducting the exhaust gases through water, which water has been supplemented with chemical additives or absorbents.

Adsorption is also an efficient and cost-effective process for removing substances from a medium. In this process exhaust gases are conducted over and/or through a particular material, capable to hold back substances present in the exhaust gases on its surface. A known advantage of adsorbents resides in that they may be essentially regenerated. The substances held back/adsorbed on the adsorbent are removed, e.g. by thermal measures and the adsorbent may be used again. In the past, activated carbon has turned to be one of the most prominent adorbents used since it exhibits a relatively large surface.

Even though activated carbon is a good adsorbent, its use is associated with some drawbacks.

Simply for safety reasons activated carbon may not be used with exhaust gases exhibiting higher temperatures, since activated carbon as such is inherently combustible. Also conventional thermic desorption is problematic, since the temperature need to be carefully selected. On the one hand it must not be too high for the above reason, on the other hand the temperature need to be high enough to allow complete desorption of the substances adsorbed, which balance is often difficult to achieve.

In addition, use of activated carbon may negatively influence the utilization of the accumulating flue ashes for industrial purposes. Flue ashes, usually collected from filter devices of the power plants is considered a valuable good, and is used as a substitute to cement in the production of concrete. The quality of flue ashes is negatively influenced by adding activated carbon into the steam of stack gas/exhaust gas and puts its use in the concrete industry at stake. The main reason for the reduced quality of such flue ashes resides in that the activated carbon now contained therein adsorbs additives, e.g. creators of air voids, which are immensurable for good freeze-dew-properties of the concrete. Hence, additional and expensive measures need to be taken, so as to eliminate the activated carbon from the flue ashes prior to their further usage.

SUMMARY OF THE INVENTION

For this reason, a problem of the present invention resides in providing a cost-effective and efficient means for reducing the amount of contaminants in exhaust gases, which means may be used in a multi-purpose manner and which should not exhibit the drawbacks of the prior art.

This problem has been solved by providing a mineral, namely Trass in a modified form, which exhibits an active surface of at least about 40 $m^2/g$.

Trass is the usual name of a volcanic tuff, a grey or cream-coloured fragmental rock, largely composed of pumiceous dust. Mixed with lime and sand, or with Portland cement, it is extensively employed for hydraulic work. It may be found in several locations, such as in the Eifel, France. In Germany there is Bavarian Trass, also called Suevit, or Rheinischer Trass. Bavarian Trass. Suevit exhibits a pore volume of about 0.25 $cm^3/g$, Rheinischer Trass a pore volume of about 0.15 $cm^3/g$. In contrast, activated carbon shows a pore volume of 0.4 to 2 $cm^3/g$. Even though having a relatively large pore volume, Suevit exhibits an active surface for any substances to get adsorbed thereon of about 20 m$^2$/g only. Activated carbon in contrast shows an active surface for any substances to become adsorbed thereon of up to 400 m$^2$/g.

It has been found that any Trass commercially available and of any origin comprises constituents, that may be dissolved away by particular agents/liquids and may removed from the mineral so that the surface area in the mineral is excavated, that had not been accessible from the environment so far. Also, this obviously occurs without deteriorating the structural integrity of the material nor its adsorptive properties, rather surprisingly improving the said adsorptive capacity to an extent, not expected from the calculated/determined surface enlargement only.

The preparation of the mineral according to the present invention (termed modified Trass in the following), may easily, yet effectively be achieved. To this end Trass is treated with an agent, allowing dissolution of particular constituents of the Trass and soluble in the agent utilized.

The Trass put to use in the present invention may be any known Trass derived from any region, such as Bavarian Trass, Rheinischer Trass, Trass from the Black Forest (Germany), Trass from the Eifel or the like, i.e. natural Puzzolan, created during volcanic activity all over the world. The Trass will be put into a suitable container and contacted with the agent, designed for dissolving away substances in the mineral.

As the agent, any agent may be used, capable to dissolve substances in the Trass, so that the substances may be dissolved away.

Non-limiting examples for such an agent are water, preferably distilled water, or a mixture of water and surfactants, or acids or any combination thereof.

Water as such has proven to be effective in dissolving and washing out substances from the Trass, which property has been found to be even improved when using a water/surfactant mixture. Without wishing to be bound by any theory it is presently contemplated that the surfactants improve the capacity of water to dissolve away the substances out of the Trass, in that they reduce the surface tension of the water so that the water may even get or creep into pores originally closed by the said substances soluble in water. The substances may thus be dissolved and transported out of the mineral more efficiently. As surfactants to be usable in the present invention any conventional non-ionic or ionic surfactant may be used, such as anionic, kationic or amphoteric surfactants.

Another effective agent to be used for treating the Trass are acids, for example conventional inorganic or organic acids, by means of which components soluble in acids, such as calcium oxide (CaO) may be dissolved away from the Trass.

Examples of anorganic acids are HBr, HCl, HClO$_3$, HClO$_4$, HNO$_3$, H$_2$SO$_4$, H$_3$PO$_4$, H$_3$PO$_3$ etc. Examples of organic acids to be used in treating the Trass are HCOOH, CH$_3$CO$_2$H, CCH$_2$CO$_2$H, Cl$_3$CCOOH, citric acid, lactic acid etc. Preferred acids are HCl and HNO$_3$, since they are capable of forming water soluble salts with calcium, H$_2$SO$_4$, or citric acid, since available on a large scale.

The Trass is contacted with the agent for a time period and under conditions, sufficient for achieving a desired increase in the surface area. In this respect the agent selected, i.e. the water/surfactant mixture or the acid, the respective concentration of the agent as well as the temperature and the duration of the treatment are parameters to be considered for achieving a desired increase of the active surface of the Trass.

When using a water/surfactant mixture the surfactant is present in the water in an amount of about 2-12 vol.-%, preferably 3-8 vol.-% and more preferred about 4-6 vol.-%.

In case of using an acid, such acid may be present in an amount of from about 5-50 vol.-%, preferably 10-40 vol.-%. Preferred amounts are 15% or 20% or 25% or also 30%.

The temperature selected during the treatment may be ambient temperature, i.e. may be in a range from about 20° to 25° C., or may be in a higher range, e.g. of from 30° C. or more, e.g. at about 40° C., or 50° C., or 60° C., or 70° C., or 80° C. or 90° C. or 100° C. or 110° C., or 120° C. or more. It will be understood that in case higher temperatures are used, the skilled person will select appropriate apparatuses so as to consider the boiling point of the liquid, a possible evaporation. In case he temperature is selected to be above the boiling point of the liquid appropriate reflux devices or even pressurized devices will be used.

The time period for treating the Trass will be selected such that that the desired increase in active surface may be achieved, that is an active surface of at least 40 m$^2$/g, or at least 50 m$^2$/g or at least 60 m$^2$/g or at least 70 m$^2$/g, or at least about 80 m$^2$/g, or at least about 90 m$^2$/g or at least 100 m$^2$/g or at least 110 m m$^2$/g or at least about 120 m$^2$/g, or at least 130 m$^2$/g, or at least 140 m$^2$/g, or at least 150 m$^2$/g, or at least 160 m$^2$/g, or at least 170 m$^2$/g, or at least 180 m$^2$/g or more. The time period, during which the agent is contacted with the Trass to achieve a desired increase in active surface is usually 10 min or more, or 15 minutes or more, or 20 minutes or more, or 30 minutes or more, or 1 hour or more, or 1.5 hours or more.

The mineral to be treated, i.e. the Trass, may be mixed during the treatment, e.g. by stirring the solution in which the contact takes place, or by shaking the container, in which the solution is comprised, so as to improve the contact of the agent with the Trass.

According to a preferred embodiment the Trass is contacted first with an acidic agent and subsequently with a water/surfactant mixture or vice versa. Here the acid-soluble components may be dissolved away and then washed out during the subsequent treatment with the water/surfactant mixture. Alternatively, in case the water/surfactant mixture is put to use in a first step it will open the pores so far clogged and enlarge the surface area as such, while in a next step the acid will dissolve away acid soluble constituents, so far not accessible for the acid as such.

In general, the material dissolved away from the Trass will be separated from the solid material by subsequent washing steps. This may be achieved by contacting the modified Trass with deionised water at ambient or elevated temperatures, as referred to for the treatment with the agent above (water/surfactant mixture or acid). According to a preferred embodiment the material obtained after treatment with the agent is contact several times with deionised water, i.e. twice or three times, so as to achieve an essentially complete removal of the dissolved components and the agents utilized in the treatment from the Trass.

When using an acidic agent, the first washing steps may be carried out using a moderate alkaline solution, i.e. using alkali, e.g. NaOH or KOH, at an pH of about 8-9. The progress of washing may easily be ascertained by determining the pH of the washing solution after the washing step. Alternatively or subsequently a system buffered at a moderate alkaline or neutral pH may be used. The washing steps will generally be repeated, until the washing water exhibits a desired pH, e.g. a neutral pH.

According to a preferred embodiment the washing process will be stopped already at a stage, where the washing water after contact with the modified Trass still exhibits an acidic pH. The The pH of the washing water may still be around about 2, or 3, or 4, or 5 or 6, indicating that residual amounts of acid still remain in the modified Trass. Traces of acid in the Trass have been found to be advantageous for the deposit of mercury. Alternatively, for the last washing steps or the last washing step itself a washing solution with a pre-set pH is used.

As is known in the art deposition of mercury is influenced by a reaction with a component present in exhaust/flue gases itself, namely hydrochloric acid which reacts with mercury in the following way:

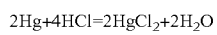

$$2Hg+4HCl=2HgCl_2+2H_2O$$

Hence, in case the present modified Trass still contains residual amounts of the acidic agent an enhanced deposition of mercury will be achieved.

According to another embodiment the invention relates the use of the present modified Trass obtained as described above for the purification of fluids, such as exhaust gases, emitted by combustion and power plants, or such as liquids, e.g. water, ethanol or carbohydrates, such as gasoline, heating oil etc.

The present modified Trass, which exhibits an increased surface area/active surface as compared to native Trass, has been shown to be an excellent adsorptive agent, even having an adsorptive capacity exceeding that expected from the mere enlargement of the surface area. The present modified Trass may thus be used as an adsorbent agent for any applications, wherein normally activated carbon is put to use.

An advantage of the present modified Trass resides in that it shows a surprisingly high adsorptive capacity for mercury and is also not flammable as is activated carbon. For this reason it may directly be introduced into exhaust or flue gases of combustion plants without any necessity for cooling those gases. Even temperatures of 800° C. do not alter the structure of the modified Trass, so that according to an alternative embodiment, the present modified Trass may also be introduced into the combustion chamber itself with the effect that the modified Trass is deposited together with other components of the exhaust gas on fabric or electric filters arranged downstream and may react with the contaminants during the entire passage to the filters. In contrast to activated carbon the modified Trass is highly abrasive resistant and does not produce fine dust.

The present modified Trass may also be used for the purification of liquids, such as e.g. water, especially tap water. Due to the biological material, such as bacteria, like cyan bacteria, present in the water to be purified the activated carbon used for this purpose could so far not be regenerated. Regeneration including removal and destruction of the biological material ensues heating the adsorptive agent to a such a temperature, which negatively influenced the structure of activated carbon. In contrast the present modified Trass may be regenerated easily by heating to high temperatures, at which biological material is completely incinerated.

Trass and the present modified Trass may be ground to any desired size using conventional methods, i.e. to granules or to powder. If in a size of about <100 μm, preferably <50 μm it may directly be used in the air stream process. It may be injected into the exhaust gas in a conventional manner and fluidized therein, wherein the solids will be collected at a fabric or electric filter, conventionally used in combustion plants. Alternatively the modified Trass may also be used in a packed bed.

Another advantage of the present modified Trass as compared to e.g. activated carbon is to be seen in that it exhibits a large water absorption capacity. Hence, in purifying exhaust gases the present modified Trass allows the purification process to be run near the dew point, without the filter becoming cemented, which cementation would occur when using activated carbon under these conditions. In addition, the present modified Trass does not deteriorate the properties of the flue ash to be used for the production of concrete.

The present modified Trass may be used alone for purifying exhaust or flue gases of a combustion plant, which substantially decreases the costs for the operating company as compared to the use of activated carbon. Also, the present modified Trass may be used as a mixture with any other known means, such as activated carbon.

Since the present modified Trass may be also be mixed with alkaline means without deteriorating its adsorptive properties, such as e.g. calcium hydroxide, calcium carbonate, quicklime, dolomite, sodium carbonate and/or sodium carbonate, also acidic components, present in the exhaust and/or flue gases may be removed. A preferred mixture is the present modified Trass together with carbonaceous compounds and/or lime derivatives, e.g. a mixture of the present modified Trass with calcium carbonate and/or activated carbon.

According to an embodiment the present modified Trass is used in an acidic form, i.e. containing remaining amounts of the acid agent therein, used to increase the active surface thereof and then either subsequently or at the same time with a neutral modified Trass according to the present invention and/or together with basic and/or carbonaceous means.

According to another embodiment the present invention also relates to the use of the present modified Trass as a carrier for additional adjuvants/additives, such as e.g. sulfides, polysulfides or elemental sulfur, which components assist in removal of mercury from fluids. Alternatively, or in addition catalytic agents may be incorporated on the surface area of the present modified Trass, such as vanadium, tungsten, titanium, palladium, rhodium, platinum, auer metal, Raney-nickel, manganese dioxide, vanadium pentoxide, Samarium(III)-oxide or Hopcalite. These compounds may be deposited on the surface of the present modified Trass according to conventional methods, e.g. impregnating, preferably impregnating with soluble salts, e.g. copper nitrate.

The present modified Trass containing any of the above adjuvant components and/or catalytic agents may be used for the adsorptive purification of fluids, such as exhaust gases, and also and at the same time for a catalytic conversion of contaminants in the fluids to be purified. Examples for such applications are a SCR reduction of nitrogen oxides in exhaust gases of concrete plants or oxidation of organic material and/or chlorinated hydrocarbons and/or carbon monoxide.

Since it exhibits a surface area and also temperature resistivity comparable to alumina, the present modified Trass my also be utilized as a washcoat on ceramic bodies of catalysts, upon which catalytically active metals may be coated in a conventional manner.

Additionally it is possible to mix the present modified Trass with activated carbon and/or HOK. In this respect the present modified Trass may be loaded with components, that would otherwise clog the pores of activated carbon, such as e.g. elemental sulfur or catalytic agents suitable for oxidation processes.

Another preferred embodiment resides in that elemental sulfur may be hot-dip coated, or sinter-fused or glued with soluble glass onto the present modified Trass, so as to achieve an improved reduction of mercury emissions. In order to increase binding of mercury, the water glass may be transferred to silicagel by means of acids prior to its use, resulting in the sulfur to be finely distributed. To this end the system comprising the present modified Trass/sulfur/water glass is reacted with acids, e.g. hydrochlric acid, or acidic gases, such as $SO_2$ and/or HCL. In addition it is possible to provide in the pores of the present modified Trass acid sulfur, e.g. by immersing the present modified Trass in acid sulfur, which enables to drop out elemental mercury in said pores and eventually remove it from the fluid to be purified.

The invention will be illustrated by the following examples, which are not designed to limit the invention in any sense.

EXAMPLES

Example 1

Preparation of Modified Trass (Acids)

Bavarian Trass (commercially obtained from Märker Zement, Harburg, Germany) has been used, which had the following composition:

| | |
|---|---|
| $SiO_2$ | 50-60% |
| $Al_2O_3$ | 10-15% |
| CaO | 10-15% |
| $Fe_2O_3$ | 3-6% |
| MgO | 1-3% |
| $SO_3$ | 9-13% |
| Bulk density | 900 $Kg/m^3$ |
| d 10 | <1 μm |
| d 50 | 20-40 μm |
| d 90 | 100-130 μm |

The active surface (surface area) of 40 g of the above Trass-powder has been determined in accordance with DIN ISO 9277: 2003-05 to yield an active surface according to BET (Brunauer-Emmett-Teller-method; Device ASAP 2420, V2.09 from Micromeretics GmbH, Germany; 5 spot determination) of 22.2 $m^2/g$ 6 Batches of 40 g of the above Trass powder, each, were transferred in containers. To the Trass 100 ml of a solution were added consisting of 50 ml HCl (15 vol.-%; Merck) or nitric acid (15 vol.-%, Merck), respectively, supplemented with 50 ml distilled water each (3/3-batches). The mixture was heated under stirring at a temperature of about 50° C. for 1 hour.

After cooling the acidic liquid was decanted und the remaining Trass-powder was contacted with 100 ml of distilled water at a temperature of 50° C. for 1 hour under stirring. The washing water was changed twice after 20 minutes each by decanting and replacing it with new distilled water (100 ml). After cooling the washing water was decanted and replaced once more with 100 ml distilled water, stirred and the pH thereof was determined after 20 minutes and found to be in the range of from about 7-7.5. The washing water was again decanted and the remaining Trass powder was dried at 250° C. for 2 hours in an oven.

The active surface of the resulting Trass has been determined as above according to DIN ISO 9277: 2003-05 (BET-method; Device ASAP 2420, V2.09 from Micromeritics GmbH, Germany; 5 spot determination). The following results have been achieved:

| Batch | 1 (HCl) | 84.2 $m^2/g$ |
|---|---|---|
| | 2 | 83.9 $m^2/g$ |
| | 3 | 84.7 $m^2/g$ |
| | 4 ($HNO_3$) | 95.8 $m^2/g$ |
| | 5 | 92.9 $m^2/g$ |
| | 6 | 95.7 $m^2/g$ |

Example 2

Preparation of Modified Trass (Acid & Water/Surfactant)

40 g of the Bavarian Trass mentioned in Example 1 were contacted in a suitable container with a solution consisting of 50 ml HCl (15 vol.-%; Merck) and 50 ml distilled water. The mixture was heated under stirring at a temperature of about 50° C. for 1 hour.

The supernatant was decanted und the remaining Trass was contacted for 1 hour with 100 ml distilled water at a temperature of 50° C. under stirring. The washing water was changed twice after 20 minutes each by decanting and replacing it with new distilled water (100 ml). The washing water was removed by decanting and the remaining Trass was dispersed in 100 ml of a conventional urinary stone and limscale remover (5-15% organic acids, <5% non-ionic surfactants; obtained from Mellerud, Brüggen, Germany) and stirred for 4 hours at ambient temperatures.

Then, the supernatant was decanted off and the Trass was washed with 50 ml distilled water at ambient temperatures for 30 minutes. Subsequently the resulting Trass ways dried at 250° C. for 2 hours in an oven and the active surface was determined according to DIN ISO 9277: 2003-05 to be 102 $m^2/g$.

Example 3

Preparation of Modified Trass (Acids)

Four batches of 40 g of the Bavarian Trass as described in Example 1, above, were contacted, each in suitable containers with a solution consisting of 50 ml HCl (15 vol.-%; Merck) or 50 ml $H_2SO_4$ (20 vol.-%; Merck), respectively and 50 ml distilled water (2/2 batches). The mixtures were heated under stirring at a temperature of about 70° C. for 1.5 hour under reflux.

After cooling the supernatants were decanted and the remaining Trass was contacted with 100 ml of distilled water at ambient temperatures for 10 minutes under stirring. The washing water was changed once after 5 minutes by decanting and replacing it with new distilled water (100 ml). The washing water was decanted and the remaining Trass powder was dried at 250° C. for 2 hours in an oven.

| Batch | 1 (HCl) | 124.5 $m^2/g$ |
|---|---|---|
| | 2 | 119.7 $m^2/g$ |
| | 3 ($H_2SO_4$) | 108.6 $m^2/g$ |
| | 4 | 107.5 $m^2/g$ |

Example 4

Preparation of Modified Trass (Water)

40 g of the Bavarian Trass as described in Example 1, above, was contacted with 100 ml distilled water and stirred at ambient temperatures for 1 hour. The supernatant was decanted and the remaining Trass was dried in an oven at 250° C. for 1 hour. The active surfaces was determined as above and found to be 62 m$^2$/g according to BET (determination as above in example 1).

Example 5

Preparation of Modified Trass (Water/Surfactant)

40 g of the Bavarian Trass as described in Example 1, above, was contacted with 100 ml of a conventional urinary stone and limescale remover (5-15% organic acids, <5% non-ionic surfactants; obtained from Mellerud, Brüggen, Germany), in a suitable container and stirred at ambient temperature for 1 hour.

The supernatant was decanted und the remaining Trass washed once with 100 ml of distilled water at ambient temperatures for 30 minutes under stirring. The Trass powder remaining was dried at 250° C. for 2 hours in an oven and the active surface was determined according to DIN ISO 9277: 2003-05 to be 78 m$^2$/g.

Example 6

Preparation of Modified Trass (Water/Surfactant)

40 g of the Bavarian Trass as described in Example 1, above, was contacted with 100 ml of a conventional urinary stone and limescale remover (5-15% organic acids, <5% non-ionic surfactants; obtained from Mellerud, Brüggen, Germany), in a suitable container and stirred at a temperature of 70° C. for 2 hours.

The supernatant was decanted und the remaining Trass washed once with 100 ml of distilled water at ambient temperatures for 30 minutes under stirring. The Trass powder remaining after the last washing step was dried at 250° C. for 2 hours in an oven and the active surface was determined according to DIN ISO 9277: 2003-05 to be 127 m$^2$/g.

Example 7

Preparation of a Modified S-Trass (Mixture)

5 g of the modified Trass prepared according to example 1 (HCl, surface area 83.9 m$^2$/g; size <60 µm), 0.2 g sulfur (fine powder) and 0.5 g natron water glass (solid content 42%) (all manufacture from Merck, Germany) were mixed in a mixer (Waring) for 5 minutes. The resulting mixture was a dry, powdery mixture (designated modified S-Trass).

Example 8

Use of the Modified Trass in the Purification of Exhaust Gas 27 l of a gas, comprising the following pre-determined components:
  nitrogen: 90 Vol.-%
  oxygen: 10 Vol.-%
  HCl 18.1 mg/l
  Humidity 0.15 g/l
  mercury (Hg$_2$Cl$_2$) 8.1 µg
were guided at a temperature of 180° C. through a tube (length 27 cm, volume 42 ml) containing 250 mg of a mixture, comprising 240 mg calcium hydroxide powder (Märker, Harburg) and 10 mg of a modified Trass (prepared according to example 1) exhibiting an active surface of 83.9 m$^2$/g (duration of gas passing through: 12 minutes). As a control a mixture of 240 mg calcium hydroxide powder (Märker, Harburg) and 10 mg of a conventional Bavarian Trass exhibiting an active surface of 22.2 m$^2$/g has been used.

After passing through the tubes (test and control tube) the gas was collected and the amount of mercury originally present (8.1 µg; determined by means of an absorption spectrometer) was determined. The following amounts were detected:
  test: about 0.7 µg (about 92% reduction)
  control: about 7 µg (about 12% reduction)

The above shows that the reduction of mercury in the purified gas by means of the modified Trass surprisingly exceeds the amount to be expected according to the surface area being enlarged (vs. the original Trass; to be expected 4 fold increase—determined >7 fold increase).

Example 9

S-Trass in the Purification of Exhaust Gases 27 l of a gas, comprising the following pre-determined components:
  nitrogen: 90 Vol.-%
  oxygen: 10 Vol.-%
  HCl 18.1 mg/l
  Humidity 0.15 g/l
  mercury (Hg$_2$Cl$_2$) 8.1 µg
were guided at a temperature of 150° C. through a tube containing 250 mg of a mixture, comprising 240 mg calcium hydroxide powder (Märker, Harburg) and 10 mg of a modified S-Trass (prepared according to example 7) exhibiting an active surface of 83.9 m$^2$/g (tube size and contact time as in example 8). As a control a mixture of 240 mg calcium hydroxide powder (Märker, Harburg) and 10 mg of a conventional Bavarian Trass exhibiting an active surface of 22.2 m$^2$/g has been used.

After passing through the tubes (test and control tube) the gas was collected and the amount of mercury originally present (8.1 µg; determined by means of an absorption spectrometer) was determined. The following amounts were detected:
  Test: about 0.4 µg (97% reduction)
  Control: about 6.8 µg (13% reduction)

What is claimed is:

1. A modified Trass having an active surface according to the Brunauer-Emmett-Teller (BET) method of ≥about 40 m$^2$/g, obtained by a method comprising the steps of:
   (a) contacting Trass with a water/surfactant mixture to dissolve away components in the Trass and excavating the surface area; and
   (b) removing the dissolved components from the Trass to obtain the modified Trass.

2. The modified Trass according to claim 1, wherein the Trass of step (a) is derived from Bavarian Trass Rheinischer Trass, Trass from the Black Forest in Germany or Trass from the Eifel in France.

3. The modified Trass according to claim 1, wherein the modified Trass has an active surface of ≥about 60 $m^2/g$.

4. The modified Trass according to claim 1, which is impregnated with a component selected from the group consisting of sulfides, polysulfides, a metal, a metal salt, catalytically active substances and any combination thereof, or which is charged with a component selected from the group consisting of elemental sulfur, water glass and any combination thereof.

5. The modified Trass according to claim 4, wherein the metal or metal salt, respectively are selected from the group consisting of vanadium, tungsten, titanium, palladium, rhodium, platinum, auer metal, Raney nickel, manganese oxide, Vanadiumpentoxide, samarium(III)-oxide, Hopcalite and any combination thereof.

6. The modified Trass according to claim 1, mixed with coke, activated carbon and/or alkaline components.

7. The modified Trass according to claim 1, wherein the modified Trass has an active surface of ≥about 80 m2/g.

8. The modified Trass according to claim 1, wherein the modified Trass has an active surface of ≥about 100 m2/g.

9. The modified Trass according to claim 1, wherein the modified Trass has an active surface of ≥about 120 m2/g.

10. The modified Trass according to claim 1, wherein the modified Trass has an active surface of ≥about 140 m2/g.

11. A process for the preparation of a modified Trass according to claim 1 comprising the steps of:
   (a) contacting Trass with a water/surfactant mixture to dissolve and excavate away components in the Trass; and
   (b) removing the dissolved components from the Trass.

12. The process of claim 11, wherein the contacting of the water/surfactant mixture to dissolve and excavate away components with the Trass is effected at a temperature ranging from ambient temperature up to 150° C.

13. A method of purifying a fluid comprising contacting said fluid with modified Trass according to claim 1.

14. The method according to claim 13, wherein the fluid is selected from the group consisting of exhaust gases and tap water.

15. The method according to claim 13, wherein the purifying comprises removal of contaminants from the fluid, wherein said contaminants are selected from the group consisting of mercury, heavy metals, nitric oxide, dioxine, chlorinated furanes, chlorinated hydrocarbons, aromatic hydrocarbons, carbon monoxide, hydrochloric acid, sulfur dioxide, sulfur hydride, bacteria, fungi, biological debris and any combination thereof.

* * * * *

UNITED STATES PATENT AND TRADEMARK OFFICE
CERTIFICATE OF CORRECTION

Page 1 of 2

PATENT NO. : 9,597,654 B2
APPLICATION NO. : 14/409376
DATED : March 21, 2017
INVENTOR(S) : Konrad Fichtel et al.

It is certified that error appears in the above-identified patent and that said Letters Patent is hereby corrected as shown below:

On the Title Page

Item (57), (Abstract) at Line 7, change "Tass" to --Trass--.

In the Specification

In Column 2 at Line 19, change "adorbents" to --adsorbents--.

In Column 3 at Line 25, change "Puzzolan," to --Pozzolan,--.

In Column 3 at Line 56, change "anorganic" to --inorganic--.

In Column 4 at Line 23, change "that that" to --that--.

In Column 4 at Line 27, change "110 m $m^2/g$" to --110 $m^2/g$--.

In Column 5 at Line 6, change "The The" to --The--.

In Column 6 at Line 62, change "my" to --may--.

In Column 7 at Line 12, change "hydrochlric" to --hydrochloric--.

In Column 7 at Line 48, change "Micromeretics" to --Micromeritics--.

In Column 7 at Line 49, after "$m^2/g$" insert --.--.

Signed and Sealed this
Twelfth Day of June, 2018

Andrei Iancu
*Director of the United States Patent and Trademark Office*

CERTIFICATE OF CORRECTION (continued)
U.S. Pat. No. 9,597,654 B2

In the Claims

In Column 10 at Line 65, in Claim 2, after "Bavarian Trass" insert --,--.

In Column 12 at Line 12, in Claim 13, after "with" insert --a--.